United States Patent [19]

Miyazaki

[11] Patent Number: 5,785,432
[45] Date of Patent: Jul. 28, 1998

[54] OUTER RING SPACER FOR DOUBLE ROW ROLLING BEARING UNIT

[75] Inventor: Seizo Miyazaki, Fujisawa, Japan

[73] Assignee: NSK Ltd., Tokyo, Japan

[21] Appl. No.: 805,824

[22] Filed: Feb. 26, 1997

[30] Foreign Application Priority Data

Feb. 26, 1996 [JP] Japan ................... 8-038430

[51] Int. Cl.$^6$ ................................................ F16C 19/08
[52] U.S. Cl. ........................................ 384/520; 384/551
[58] Field of Search .................................. 384/520, 521, 384/512, 517, 518, 563

[56] References Cited

U.S. PATENT DOCUMENTS

| | | | |
|---|---|---|---|
| 4,401,349 | 8/1983 | Campbell | 384/520 |
| 4,820,060 | 4/1989 | Braune et al. | 384/512 |
| 5,249,871 | 10/1993 | Latorre et al. | 384/551 |

Primary Examiner—Lenard A. Footland
Attorney, Agent, or Firm—Helfgott & Karas, P.C.

[57] ABSTRACT

An outer ring spacer for use in a double row rolling bearing unit fitted onto a shaft and comprising inner rings externally secured to the shaft having a pair of spaced apart inner ring raceways, a pair of outer rings having an inner peripheral face formed with outer ring raceways facing respective inner ring raceways, and a plurality of rolling elements provided between the inner ring raceways and outer ring raceways, the outer ring spacer fitted between the outer rings, and comprising a cylindrical spacer body formed with axially opposite parallel end faces abutted against the mutually facing end faces of the outer rings, and a displacement prevention ring internally secured to one axial end of the spacer body, and having a portion protruding from one of the parallel end faces of the spacer body so as to be engaged with the inner peripheral surface of one end portion of the outer rings to prevent the spacer body from being displaced radially.

5 Claims, 6 Drawing Sheets

OUTER RING SPACER FOR DOUBLE ROW ROLLING BEARING UNIT

FIELD OF THE INVENTION

The present invention is related to an outer ring spacer for double row rolling bearing unit.

DESCRIPTION OF THE RELATED INVENTION

The outer ring spacer for a double row rolling bearing unit according to the present invention, is installed for use in a double row rolling bearing unit constituting for example a rotation support section of a video tape recorder (VTR) or hard disk drive unit (HDD) for maintaining the spacing between a pair of outer rings in the double row rolling bearing unit.

A double row rolling bearing unit 1 as shown in FIG. 6 is widely used in constructing the rotation support section of a VTR or HDD. This double row rolling bearing unit 1 comprises a rotation shaft 2, a pair of rolling bearings 3, each in the form of deep groove type ball bearings, and an outer ring spacer 4.

The respective rolling bearings 3 each have an inner ring 6 formed with an inner ring raceway 5 on an outer peripheral surface thereof, an outer ring 8 formed with a outer ring raceway 7 on an inner peripheral surface thereof, and a plurality of rolling elements 9 provided so as to be freely rotatable between the inner ring raceway 5 and the outer ring raceway 7. The plurality of rolling elements 9 are rotatably retained by a respective retainer or cage 10 in each of the rolling bearing 3.

A shield plate 11 is provided at either end portion of each of the rolling bearings 3. Only cross sectional end faces of the shield plates 11 are illustrated for clarification in the drawings. Outer peripheral rims of the respective shield plates 11 are engaged on the inner peripheral surfaces in the opposite end portions of the outer rings 8, to prevent the leakage of grease contained in the region of the rolling elements 9.

The outer ring spacer 4 is inserted between the two mutually opposite end faces, that is inner end faces of the outer rings 8 of the pair of rolling bearings 3, thus preventing the spacing between the two inner end faces of the outer rings 8 from becoming less than a predetermined value. More specifically, with the double row rolling bearing unit 1, the inner rings 6 of the rolling bearings 3 are pressed towards each other to apply a predetermined pre-load to the rolling elements 9, and are externally secured in this condition (if necessary by applying a bonding agent) to the rotation shaft 2. In this condition, the respective rolling elements 9 are given an outwardly directed contact angle, thus preventing play in the radial and thrust directions.

The outer ring spacer 4 prevents the two outer rings 8 from approaching even under this pre-loading. As will be apparent from the above description, one of the inner ring raceways 5 can be directly formed on the outer peripheral surface of the rotation shaft 2. In this case, part of the rotation shaft 2 may be formed with a large diameter portion of approximately the same diameter as the outer diameter of the inner ring 6, and the inner ring raceway is formed on the outer peripheral surface of this large diameter portion.

In either case, the double row rolling bearing unit 1 is fitted with the outer ring spacer 4 as described above, and assembled in the condition shown in FIG. 6 when a predetermined pre-load applied to the rolling elements 9, and then sent from the bearing manufacturer to the VTR or HDD manufacturer. Then at the VTR or HDD manufacturer, this is fitted to the rotation support section of the VTR or HDD. Consequently, it is necessary to ensure that during shipping, the outer ring spacer 4 is not displaced from between the end faces of the two outer rings 8. Therefore, with the conventional construction shown in FIG. 6, a step portion 13 with a step face 14 is formed around the whole periphery of the outer peripheral rim on one axial end face (left end face in FIG. 6) of the outer ring spacer 4. The step face 14 of the step portion 13 is then abutted with an inner end face (right end face in FIG. 6) of one of the outer rings 8 (the left outer ring in FIG. 6), and the step portion 13 thus engaged with the inner peripheral rim of the opening portion of the opposed outer ring 8. The outer ring spacer 4 with the step portion 13 is made in a cylindrical shape by for example machining a metal such as bearing steel.

With the outer ring spacer 4 formed with the step portion 13 as shown in FIG. 6, it is difficult to accurately make the step face 14 parallel with the other end face (right end face in FIG. 6) of the outer ring spacer 4. That is to say, when the step portion 13 is formed by low cost lathe machining, the degree of parallel cannot be sufficiently maintained. As a result, the pre-load condition of one or both of the rolling bearings 3 becomes uneven around the circumferential direction. If the pre-load condition becomes uneven in this way, then vibration is likely to occur with rotation of the rolling bearings 3. This makes it difficult to achieve the required performance for the VTR or HDD in which the double row rolling bearing unit 1 is assembled.

If machining of the step face 14 is carried for example using a cylindrical grinder, then the necessary degree of parallel can be guaranteed, and the performance of the VTR or HDD ensured. However the number of machining steps is increased, thus taking time and labour thus leading to resultant increase in costs. Therefore, improvement is desirable.

SUMMARY OF THE INVENTION

The outer ring spacer for a double row rolling bearing unit according to the present invention has been developed in view of the above situation.

An object of the present invention is to provide an outer ring spacer for use in a double row rolling bearing unit, comprising a cylindrical spacer body with opposite parallel end faces and a displacement prevention ring fitted onto at least part of the spacer body and projected at least from one of the opposite parallel face ends and radially abutted to the inner peripheral surface of one of the outer rings.

DETAILED DESCRIPTION OF THE PREFERRED EMBODIMENTS

The outer ring spacer for a double row rolling bearing unit according to the present invention, as with the beforementioned conventional outer ring spacer for a double row rolling bearing unit, is fitted to a double row rolling bearing unit which is fitted onto a shaft and comprised of inner rings externally secured to the shaft at two axially spaced apart locations on an outer peripheral surface of the shaft and each having an inner ring raceway provided thereon, a pair of outer rings each having an inner peripheral face formed with an outer ring raceway facing respective inner ring raceways, and a plurality of rolling elements provided so as to be freely rotatable between the respective inner ring raceways and outer ring raceways. Furthermore, the outer ring spacer is fitted between the mutually facing end faces, that is inner end faces of the two outer rings, and is held in propping between these two inner end faces.

The inner ring raceways may be formed directly on the shaft 2 as mentioned previously.

In particular, the outer ring spacer for the double row rolling bearing unit of the present invention, comprises a spacer body formed in an overall cylindrical shape with axially opposite end faces abutted against the mutually facing end faces, that is inner end faces of the pair of outer rings, and a displacement prevention ring internally secured to at least one axial end of the spacer body. This displacement prevention ring has a portion which protrudes from the at least one axial end face of the spacer body, and engages with the inner peripheral surface of the inner end portion of the outer ring, that is of the end portion which is abutted by the axial end face of the spacer body, to thereby prevent the spacer body from being displaced radially.

With the outer ring spacer for a double row rolling bearing unit according to the present invention constructed as described above, as long as the parallelism of the axially opposite end faces of the spacer body is ensured, when the parallelism of the pair of outer rings which clamp the outer ring spacer is guaranteed. Hence the performance of the various devices fitted with the double row rolling bearing unit can be ensured. Maintaining the parallelism of the axially opposite end faces of a cylindrical spacer body can be carried out efficiently with a surface grinder. Hence any increase in machining costs is minimal.

After assembly of the double row rolling bearing unit fitted with the outer ring spacer, and before assembling the double row rolling bearing unit into the rotational support section, radial displacement of the outer ring spacer is prevented by engagement of the displacement prevention ring with an inner peripheral surface on the end of at least one of the outer rings.

Figure 1:
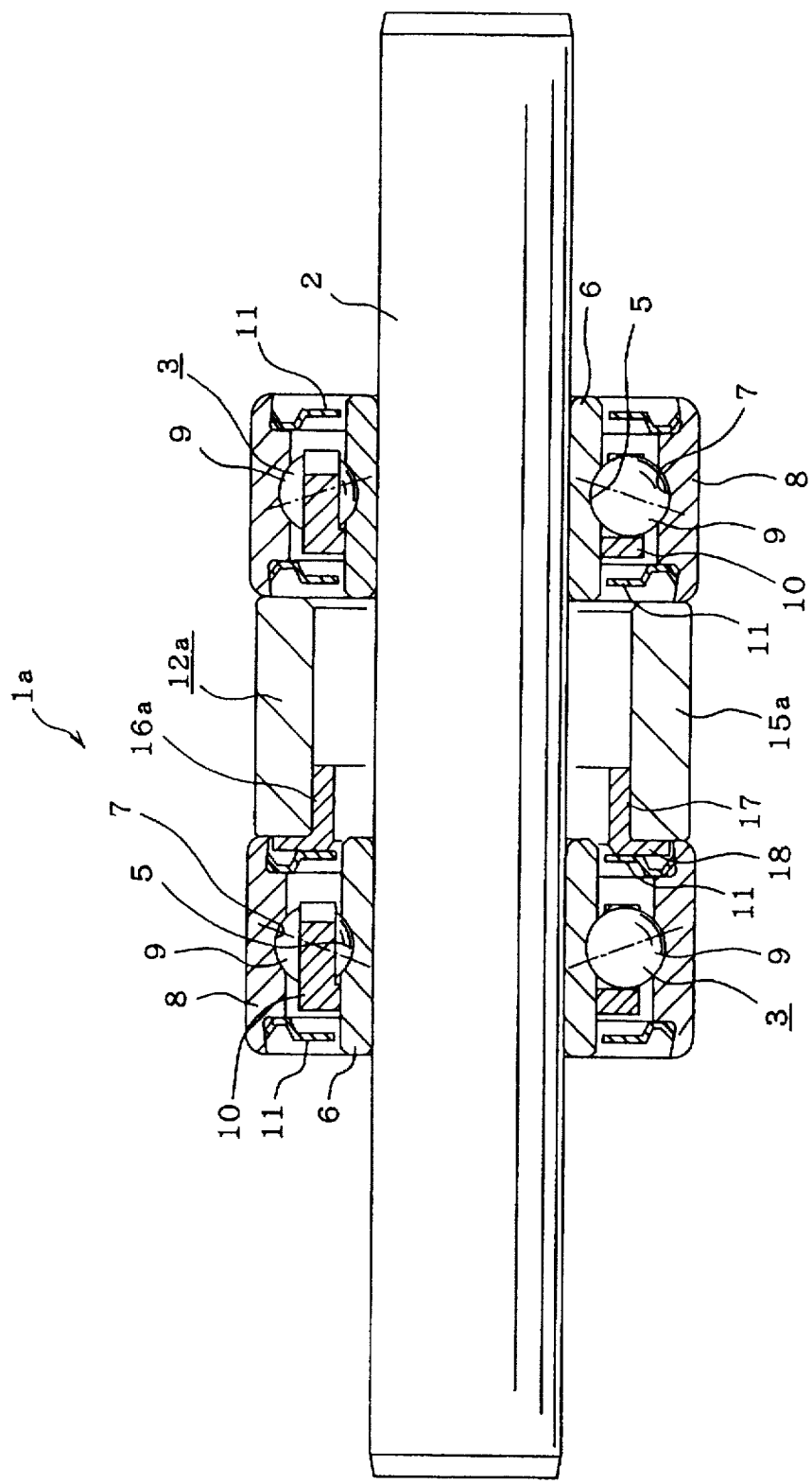
FIG. 1 is a cross sectional view of an embodiment of the present invention.
Figure 6:
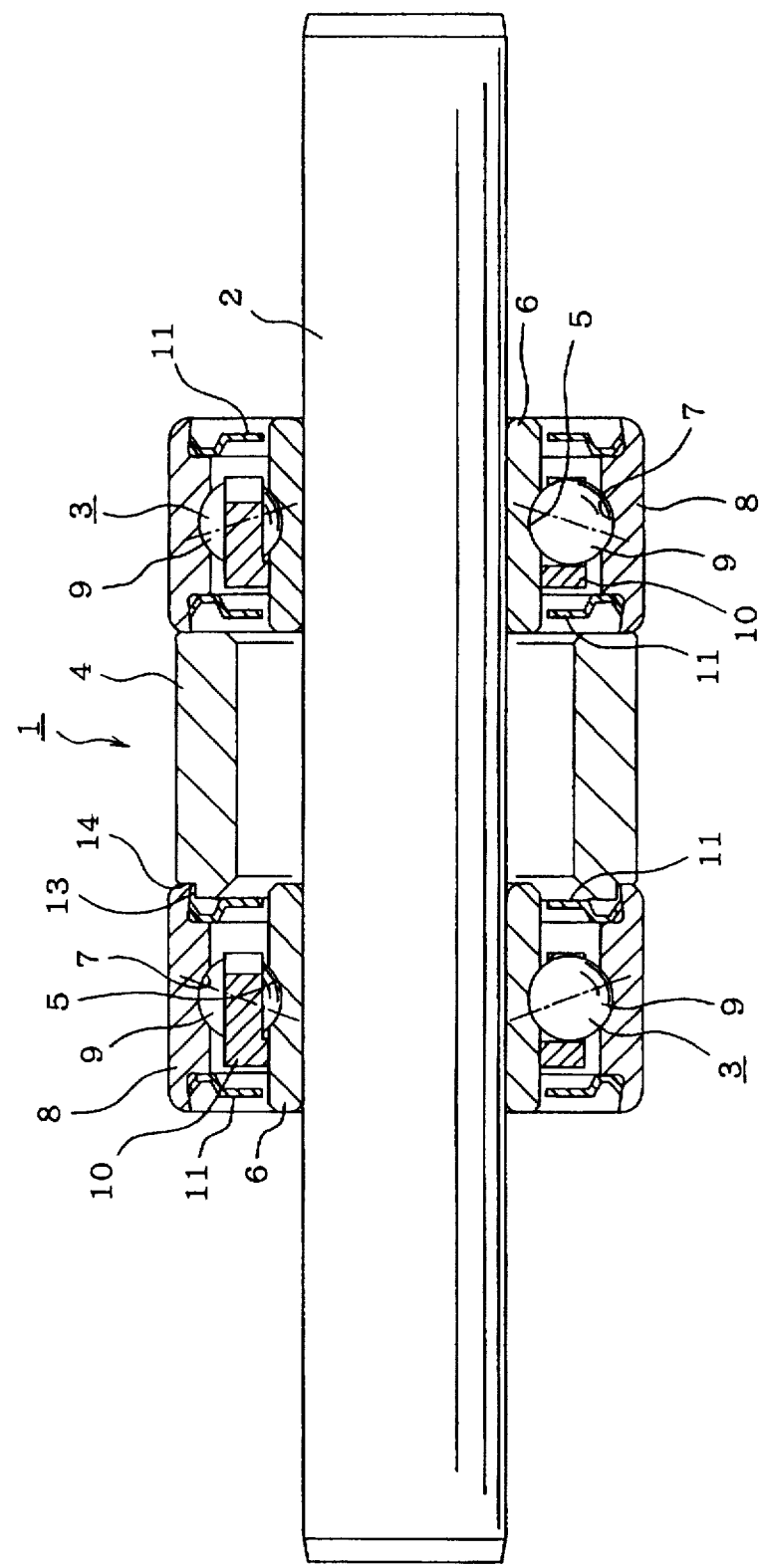
FIG. 6 is a cross sectional view of one example of the conventional structures of the present invention.

Now, FIG. 1 shows a first example of an embodiment of the present invention. The feature of the invention is the construction involving an assembly of the spacer body with a displacement prevention ring, thus enabling the degree of parallel of the pair of outer rings to be maintained at a low cost. The construction and operation of the main parts of the double row rolling bearing unit, excluding the outer ring spacer, is substantially the same as for the conventional construction shown in FIG. 6. Therefore, the components corresponding to those in the conventional construction are denoted by the same symbols as in FIG. 6, and their description is omitted or simplified. The following description is centered on the characteristic parts of the invention.

An outer ring spacer 12a fitted to the construction of this example, comprises a spacer body 15a and a displacement prevention ring 16a internally secured to one axial (left/right direction in FIG. 1) end portion (left end portion in FIG. 1) of the spacer body 15a.

The spacer body 15a is formed in a cylindrical shape from a metal material such as bearing steel, having sufficient compressive strength. The outer diameter of the spacer body 15a is made smaller than the outer diameter of the respective outer rings 8, and larger than the inner diameter of the end openings of the respective outer rings 8.

Moreover, the displacement prevention ring 16a is formed in an overall cylindrical shape of L-shape in cross-section by injection molding a synthetic resin, or by deep-drawing a metal material such as aluminum alloy which is easily deformed. More specifically, the displacement prevention ring 16a comprises a cylindrical portion 17 which can be internally secured to one end portion of the spacer body 15a by interference fitting, and a flange portion 18 extending radially outward from an outer end rim (left end ring in FIG. 1) of the cylindrical portion 17. The outer diameter of the flange portion 18 is made slightly smaller than the inner diameter of the end opening of the respective outer rings 8.

After assembling the double row rolling bearing unit 1a fitted with the outer ring spacer 12a constructed as described above, and before installing the double row rolling bearing unit 1a into the rotational support section of a VTR or HDD or the like, radial displacement (up/down direction in FIG. 1) of the outer ring spacer 12a is prevented by engagement of an outer peripheral rim of the flange portion 18 of the displacement prevention ring 16a with an inner peripheral surface on the end of the mating outer ring 8. Consequently, when the double row rolling bearing unit 1a is shipped from the bearing manufacturer to the VTR or HDD manufacturer, the outer ring spacer 12a will not slip from between the pair of outer rings 8.

Moreover, with the outer ring spacer 12a of this example, as long as the degree of parallel of the axially opposite end faces of the spacer body 15a is ensured, then the degree of parallel of the pair of outer rings 8 which clamp the outer ring spacer 12a is guaranteed. Hence the performance of the various devices fitted with the double row rolling bearing unit 1a can be ensured. The accuracy of the shape and dimensions of the displacement prevention ring 16a bear no relation to ensuring the parallelism of the pair of outer rings 8. Maintaining the parallelism of the axially opposite end faces of the cylindrical spacer body 15a can be carried out efficiently with a surface grinder. Hence any increase in machining costs is minimal.

Figure 2:
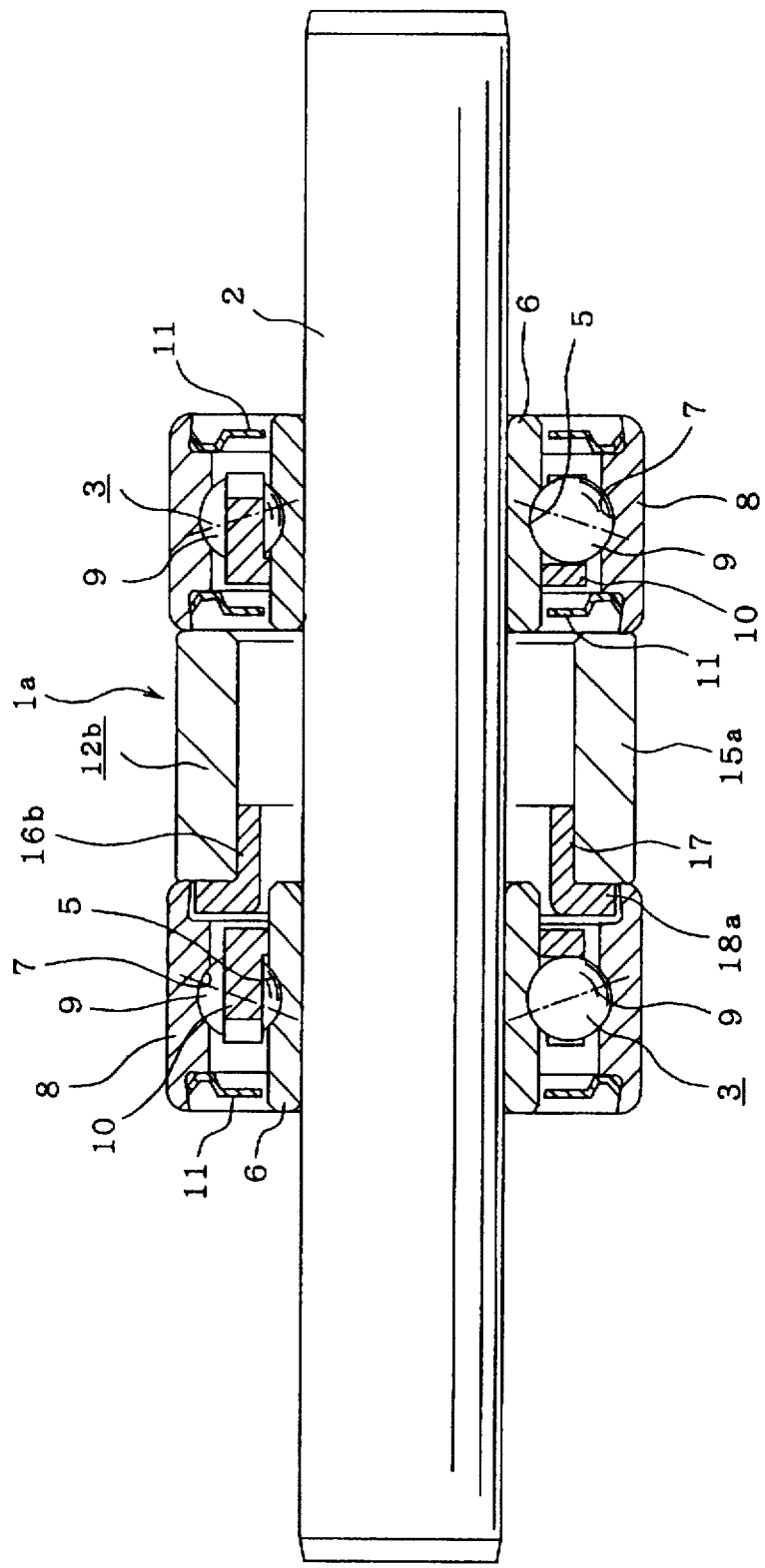
FIG. 2 is a cross sectional view of another embodiment of the present invention.

FIG. 2 shows a second example of an embodiment of the present invention having an outer ring spacer 12b. With this example, the outer ring spacer 12b has a displacement prevention ring 16b which has a flange portion 18a and a cylindrical portion 17. The flange portion 18a is formed thicker than for the case of the flange portion 18 (FIG. 1) of the abovementioned first example. This flange portion 18a also has the function of a shield plate. More specifically with this example, an inner peripheral surface (inner peripheral rim of the flange portion 18a) on one end (left end portion in FIG. 2) of the cylindrical portion 17 of the displacement prevention ring 16b, is arranged close to an outer peripheral surface on an inner end (right end in FIG. 2) of an inner ring 6 of one of the rolling bearings 3 (the left bearing in FIG. 2). Hence the shield plate 11 on the inner end side of the rolling bearing 3 as in FIG. 1 is omitted. The construction and operation of the other parts is substantially the same as for the abovementioned first example.

Figure 3:
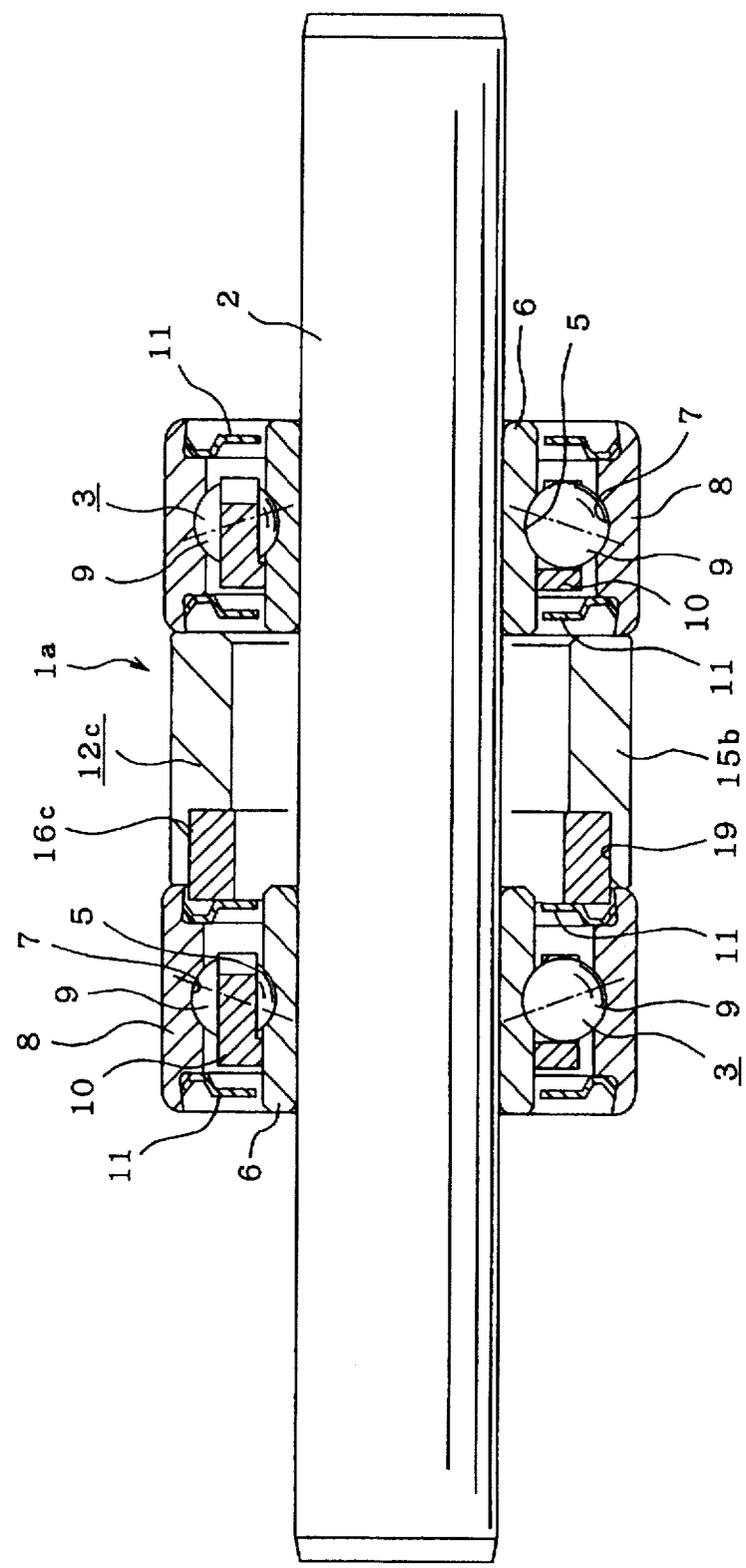
FIG. 3 is a cross sectional view of another embodiment of the present invention.

FIG. 3 shows a third example of an embodiment of the present invention having an outer ring spacer 12c which comprises a spacer body 15b and a displacement prevention ring 16c. With this example, the spacer body 15b has a step portion 19 which is formed on an inner peripheral surface at one end (left end in FIG. 3) of the spacer body 15b constituting the outer ring spacer 12c, and the displacement prevent ring 16c is formed in an overall annular shape of rectangular cross-section and internally secured to the step portion 19. One end (left end in FIG. 3) of the displacement prevention ring 16c protrudes from one end face (left end face in FIG. 3) of the spacer body 15b, and engages with an inner peripheral surface on an inner end portion (right end portion in FIG. 3) of the mating outer ring 8 of one of the rolling bearings 3 (the left bearing in FIG. 3). The step portion 19 is provided solely for internally securing the displacement prevention ring 16c, and has no relation to maintaining the parallelism of the outer rings 8 of the pair of rolling bearings 3. Consequently, the step portion 19 can be formed by low cost lathe machining. The construction and operation of the other parts is substantially the same as for the beforementioned first example.

Figure 4:
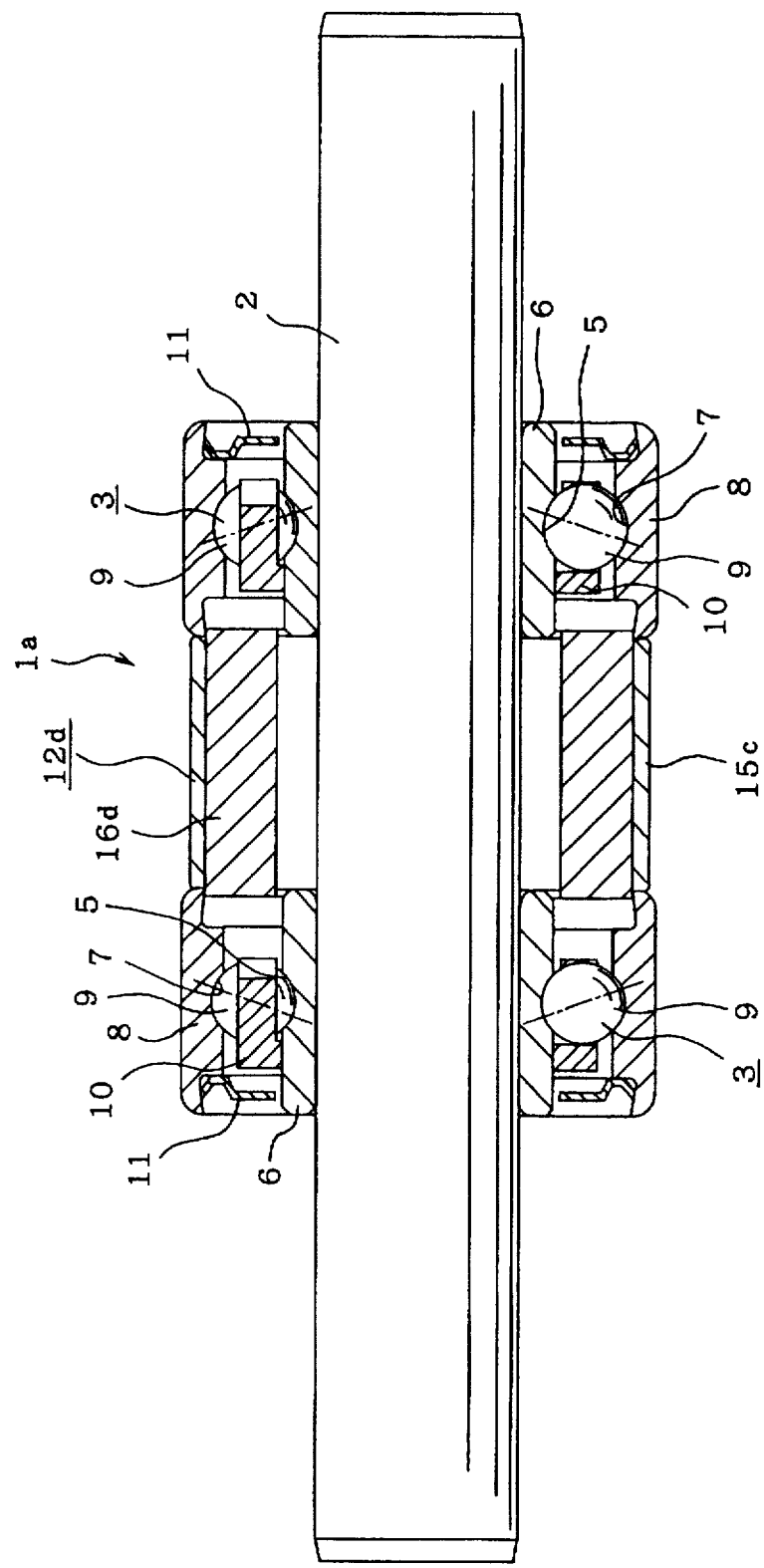
FIG. 4 is a cross sectional view of another embodiment of the present invention.

FIG. 4 shows a fourth example of an embodiment of the invention having an outer ring spacer 12d comprising a thin cylindrical spacer body 15c and a thick cylindrical displacement portion ring 16d. With this example, the outer ring spacer 12d is made up by internally securing the thick cylindrical displacement prevention ring 16d inside the thin cylindrical spacer body 15c. The length (left to right dimension in FIG. 4) of the displacement prevent ring 16d is made greater than that of the spacer body 15c. Furthermore, the axially opposite end portions (left and right end portions in FIG. 4) of the displacement prevention ring 16d protrude from the axially opposite end faces (left and right end faces in FIG. 4) of the spacer body 15c. The displacement prevention ring 16d has an outer diameter slightly smaller than the inner diameter of the outer rings 8 of the pair of rolling bearings 3, and an inner diameter slightly larger than the outer diameter of the end portions of the inner rings 6.

With the outer ring spacer 12d of this example constructed as described above, by engaging the outer peripheral surfaces of the opposite ends of the displacement prevent ring 16d with the inner peripheral surfaces on the inner ends of the respective outer rings 8, then radial displacement (in the up and down direction in FIG. 4) can be prevented.

Furthermore, by having the axially opposite end faces of the displacement prevention ring 16d covering the inner end opening of the pair of rolling bearings 3, then leakage of the grease filled inside the rolling bearings 3 can be prevented. Consequently, the shield plate 11 on the inner ends of the rolling bearings 3 as in FIG. 1 can be omitted. Other details of the construction and operation are substantially the same as for the beforementioned first example.

Figure 5:
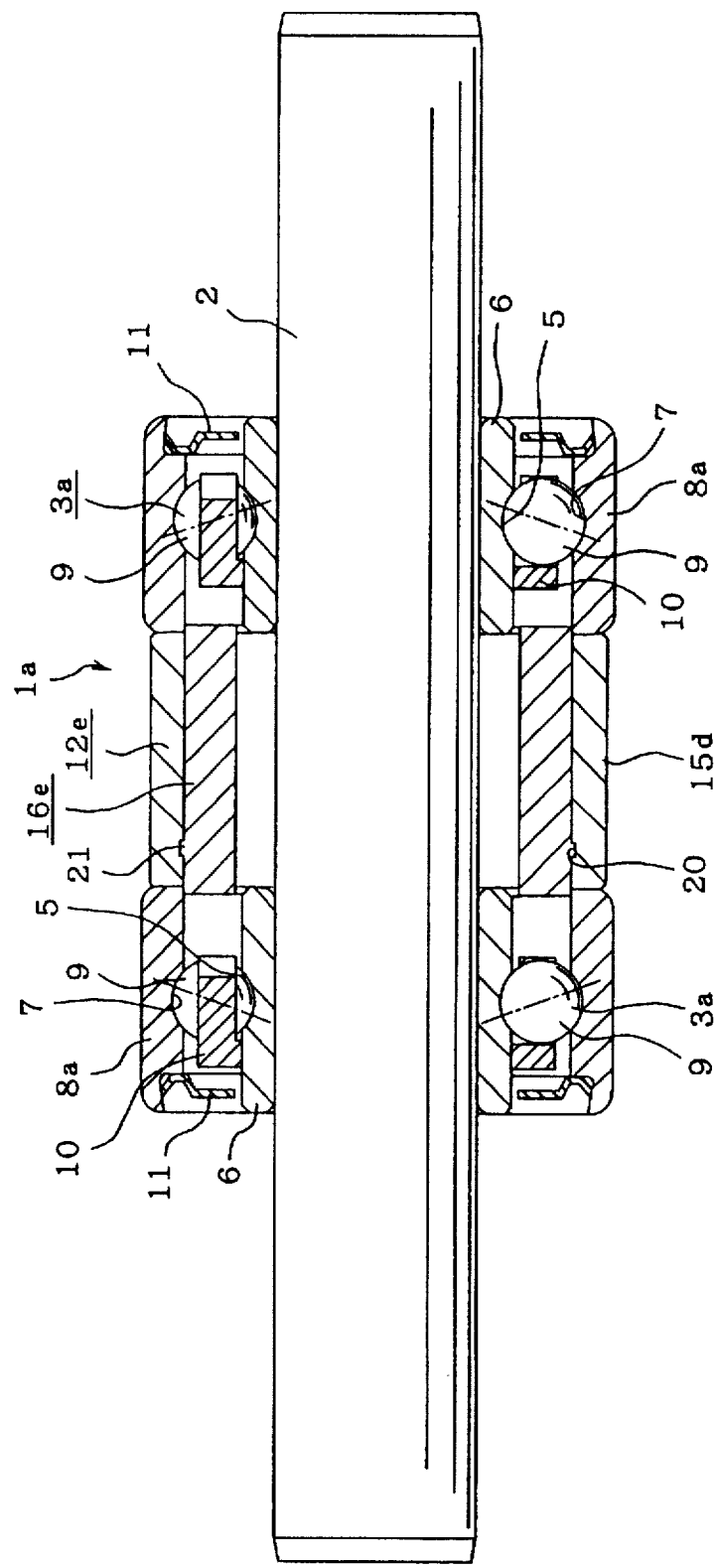
FIG. 5 is a cross sectional view of another embodiment of the present invention.

FIG. 5 shows a fifth example of an embodiment of the present invention having an outer ring spacer 12e comprising a cylindrical spacer 15d and a cylindrical displacement prevention ring 16e. With this example, the inner end portions of the outer rings 8a of a pair of rolling bearings 3a are left thick, thus making the inner diameter of the inner end portions of the outer rings 8a smaller. Engaging grooves for engaging with a shield plate, are not provided on these inner end portions. The outer ring spacer 12e is made up by internally securing the cylindrical displacement prevention ring 16e inside the cylindrical spacer body 15d. An engagement groove 20 is formed in the inner peripheral surface of the cylindrical spacer body 15d at one end portion (left end portion in FIG. 5), while an engagement protrusion 21 is formed on the outer peripheral surface of the displacement prevent ring 16e at one end portion. By engaging the engagement groove 20 with the engagement protrusion 21, then axial (left and right direction in FIG. 5) displacement of the spacer body 15d relative to the displacement prevent ring 16e is prevented. Other details of the construction and operation are substantially the same as for the beforementioned first example.

With the outer ring spacer for a double row rolling bearing unit according to the present invention, due to the above-mentioned construction and operation, then even though the manufacturing cost is low, the degree of parallel of the pair of outer rings of a double row rolling bearing unit can be sufficiently maintained. Therefore it is possible to have both lower cost and improved performance for the various devices such as VTRs or HDDs fitted with double row rolling bearing units.

What is claimed is:

1. An outer ring spacer for use in a double row rolling bearing unit fitted to a shaft and comprising a pair of spaced apart inner rings provided around the shaft and each formed with an inner ring raceway on an outer peripheral surface thereof, a pair of outer rings with end portions having an inner peripheral surface formed with outer ring raceways thereon, the outer ring raceways fading respective inner ring raceways, and a plurality of rolling elements provided so as to be freely rotatable between the respective inner ring raceways and outer ring raceways, the outer ring spacer fitted and held in propping the outer rings, the outer ring spacer comprising a radially outer cylindrical body having axially opposite parallel end faces abutted against the end portions of the pair of outer rings which are opposed to each other, and a radially inner cylindrical body internally secured to at least part of the radially outer cylindrical body so as to protrude from at least one of the axially opposite parallel end faces of the radially outer cylindrical body so as to be engaged with the inner peripheral surface at one of the end portions of the outer rings to thereby prevent the spacer body from being displaced radially.

2. The outer ring spacer of claim 1, wherein the pair of space apart inner rings are formed directly on the shaft.

3. The outer ring spacer of claim 1, the pair of spaced apart inner rings are made separate from and fitted onto the shaft.

4. The outer ring spacer of claim 1, wherein the radially inner cylindrical portion is formed in a L shape in axial cross section.

5. The outer ring spacer of claim 1, wherein the radially inner cylindrical body has a flange portion which is engaged with the inner peripheral surface at one of the end portions of the outer rings to have shield performance.

* * * * *